United States Patent Office

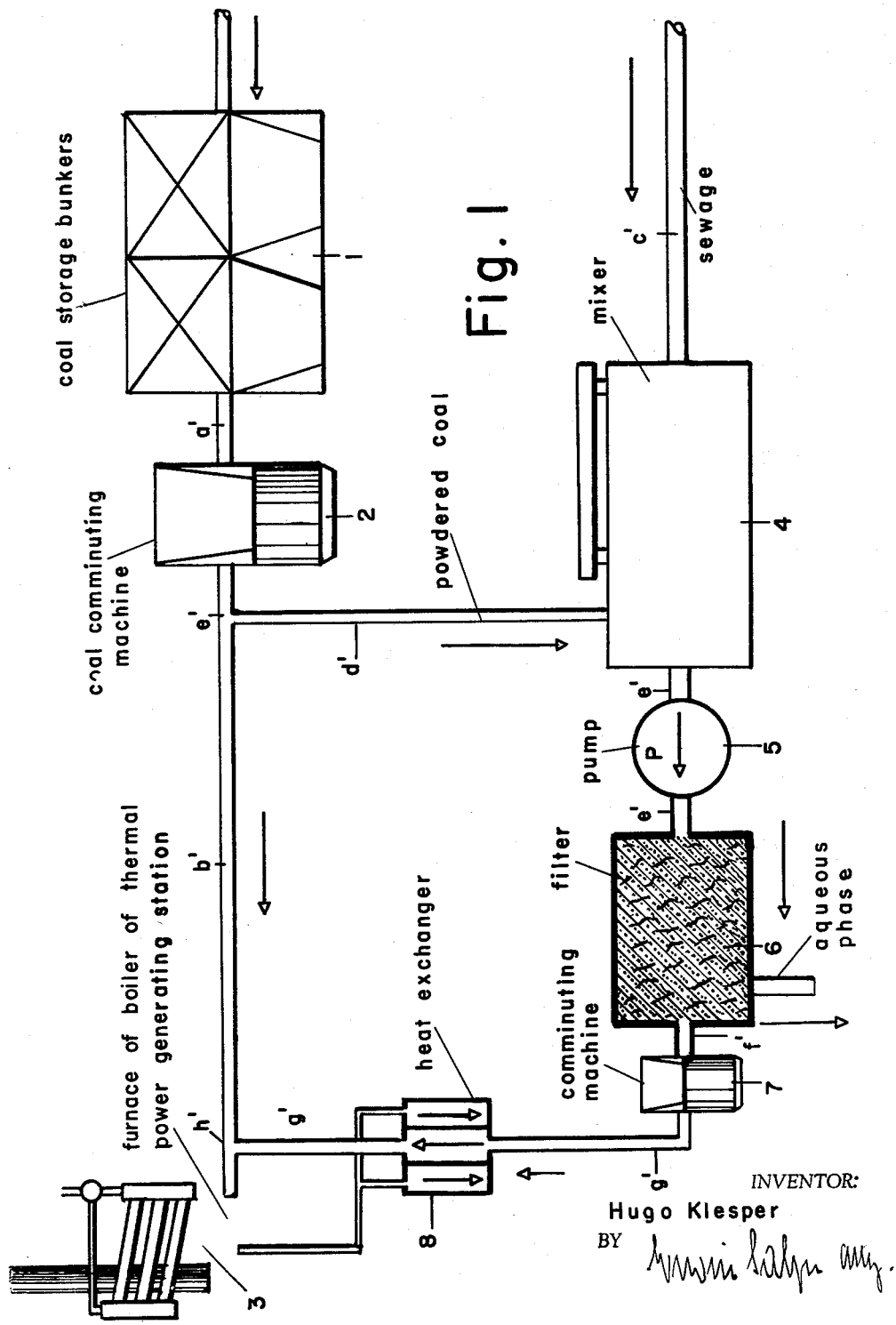

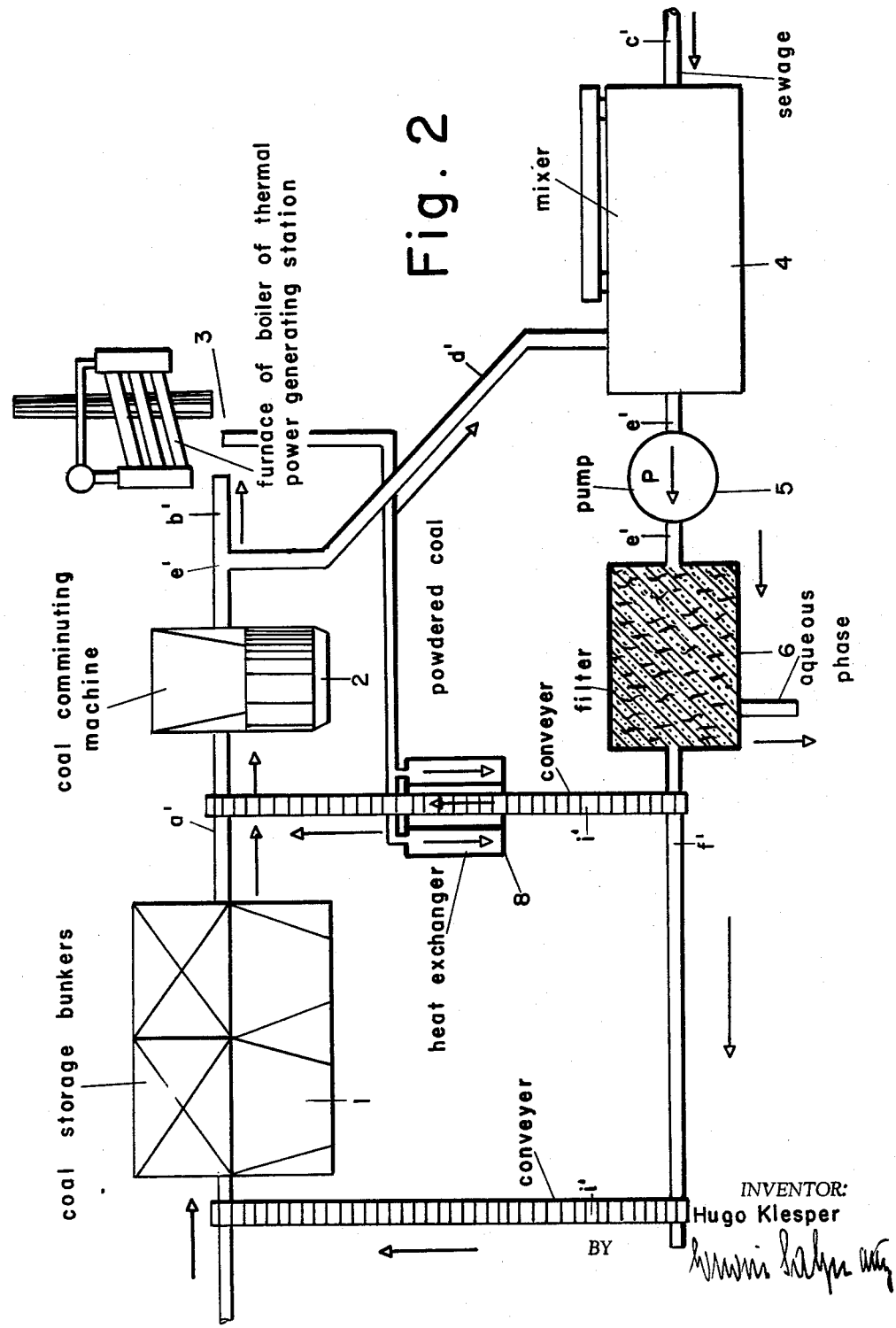

3,166,032
Patented Jan. 19, 1965

3,166,032
SEWAGE DISPOSAL BY COMBUSTION
Hugo Klesper, Michelbach, Nassau, Germany, assignor to Passavant-Werke, Michelbacher Hutte, Germany
Filed Apr. 9, 1962, Ser. No. 186,278
Claims priority, application Germany, Apr. 14, 1961, P 26,964
10 Claims. (Cl. 110—10)

This invention is concerned with and relates to the disposal of sewage, and more particularly the disposal of mud formed in sewage disposal systems and including organic matter in solid form.

The solid organic substances included in the mud of sewage have a relatively high caloric content.

It is, therefore, a general object of this invention to provide means for utilizing the caloric content of the solid organic substances included in sewage for useful combustion, or useful generation of heat.

Another object of this invention is to provide means for producing a new kind of fuel useful for heating the furnaces of boilers, particularly the furnaces of boilers of thermal power plants, which fuel includes the solid organic ingredients of sewage in a readily combustible form.

Another object of this invention is to provide integral means for sewage disposal and power generation wherein there is a cooperative relation between the means specifically intended for sewage disposal and the means specifically intended for power generation.

Another object of the invention is to provide a novel way of sewage disposal which is not subject to the many limitations and drawbacks of prior art sewage disposal methods.

The sewage occuring in sewage disposal systems is generally subjected to a sedimentation process, to a fermentation process which is carried out in large and expensive structures or towers, and finally to a drying process which calls for large areas to achieve the required vaporization of the liquid or water content of the sewage. As a result of this complex processing of sewage the content of liquid or water of the sewage which is initially in the order of 90% is reduced to the order of 50%. Sewage mud having a content of liquid or water in the order of 50% may be used in agriculture as fertilizer if there is a need for such an application of semi-dried mud. It has, however, been fund that it is not desirable to use the semi-dried mud resulting from the operation of sewage disposal systems as a fertilizer because such fertilizers contain quite frequently seeds of weeds and various other undesirable ingredients including germs, etc.

It is, therefore, another object of this invention to provide for novel ways and means for disposing of sewage which are not subjected to the aforementioned limitations and drawbacks.

Because the use of mud resulting from partial dehydration of sewage as a fertilizer is not always feasible, and because this application of sewage mud involves certain dangers, the disposal of such mud by burning has become more or less widely adopted. This calls, however, for the addition of some fuel to the mud as, for instance, for the addition of fuel oil, thus greatly increasing the cost of sewage disposal and resulting in the loss of any useful by-product of sewage disposal.

It is, therefore, another object of this invention to provide for novel ways and means for disposing of sewage by burning or combustion which are not subject to the limitations and drawbacks of conventional disposal of semi-dehydrated mud by burning thereof.

In prior art methods of disposal of sewage—be it sewage in its original or raw form or fermented sewage—the dehydration thereof by means of filters or filtering machines resulted in considerable difficulties because of the tendency of clogging of the filters by certain substances contained in the sewage. It is, however, imperative to use filters or mechanical methods of dehydration wherever space limitations do not permit to resort to bulky sedimentation systems for achieving this purpose. In all such instances which are quite frequent the dehydration of sewage by means of filtering machines such as, for instance, vacuum filters, or filter presses, is unavoidable.

It is, therefore, another object of this invention to provide ways and means for disposing of sewage which include the use of filtering machines but are free from the limitations and drawbacks to which dehydration by such machines was subjected heretofore.

In order to convert sewage as it normally occurs into a liquid which lends itself more readily to filtration various chemicals may be added to sewage as, for instance, certain salts of iron or aluminum, etc. Such additives are, however, expensive, increase by their presence more or less the volume of sewage to be processed, have a tendency to cause the release of ammonia from the sewage, and also preclude semi-dehydrated sewage contaminated by such additives to be used as a fertilizer.

It is, therefore, another object of this invention to provide for ways and means for disposing of sewage involving the dehydration of the latter by filtration, but not subject to the disadvantages or limitations inherent in the use of filtering additives.

This invention is predicated on the concept of dehydrating sewage by compacting the same, and of converting the compacted sewage into a thermally highly efficient and useful fuel. According to this invention the content of liquid of mud formed in sewage disposal systems is reduced by compacting the mud in the presence of powdered coal which is used to remove the liquid phase from the solid phase of the mud, and thereafter the content of coal of the mixture of coal and mud in cake form resulting from the process of compaction is increased to convert the mixture into a readily combustible furnace fuel, and this fuel is thereafter subjected to useful combustion in a boiler furnace, preferably a boiler furnace forming part of a thermal power generating station. An important step in carrying this process into effect is the use of powdered coal as a medium for removing the liquid phase from the solid phase of sewage which step may be carried out either by admixing powdered coal to the mud having a relatively large content of liquid and feeding this mixture of powdered coal and mud to conventional filtering machines, or by covering the filter surfaces of conventional filtering machines with a layer of powdered coal, or by combining both ways of using powdered coal as a compacting medium.

Other objects and advantages of the invention will become apparent as this specification proceeds, and the features of novelty which characterize the invention will be pointed out with particularity in the appended claims forming part of this specification. For a better understanding of the invention reference may be had to the accompanying drawings showing diagrammatically two combined sewage disposal and thermal power systems embodying the invention.

FIG. 1 is a diagram of an embodiment of the invention comprising two comminuting machines and FIG. 2 is a diagram of an embodiment of the invention comprising but one single comminuting machine.

Referring now to FIG. 1 of the drawing, numeral 1 has been applied to indicate a plurality of coal storage bunkers for storing coal in the form of pieces of lumps of relatively large size as supplied from a coal mine to a power generating station, and reference character 2 has been applied to indicate a comminuting machine or coal grinding machine for converting the coal which is stored in bunkers 1 to coal in powder or granular form. Reference character $a'$ has been applied to indicate a conventional conveyor means for supplying comminuting or grinding machine 2 with coal taken from bunkers or bins 1. The powdered coal produced by machine 2 is supplied to the furnace of a boiler 3 of a thermal power generating station by the intermediary of a conduit $b'$. Reference numeral 4 has been applied to indicate a coal and mud mixing system which may be a conventional mixing machine having rotatable arms for producing a more or less thorough mixture of coal in powder form and of mud. Mud resulting from the operation of a sewage or sewage disposal system is supplied to mixer 4 by means of pipe or conduit $c'$ and powdered coal is supplied to mixer 4 by conduit $d'$ branching off conduit $b'$ at a point $e'$ downstream of coal comminuting machine 2. It will be understood that the consistency or viscosity of the mud resulting from the mixture in mixer 4 of powdered coal and mud is much higher than the consistency or viscosity of the mud supplied to mixer 4 through conduit $c'$. This mixture formed in mixer 4 is, however, still sufficiently fluid to be moved through pipes by pumping means. A conduit $e'$ including a pump 5 supplies filtering machine 6 with a mixture of powdered coal and mud produced in mixer 4. The filtering machine 6 may be of any conventional design, suitable for dehydrating or filtering the mixture of coal and mud resulting from the operation of mixer 4. Filtering machine 6 may be of the type described in the copending patent application of Herald J. G. Schade, filed August 14, 1961, Ser. No. 132,276, for Machines for Filtering Large Quantities of Water and Other Liquids, assigned to the same assignee as the present application. Filtering machine 6 may also include conventional vacuum means for increasing the action thereof. Filtering machine 6 is preferably formed by a filter press. Whatever the nature of the filtering machine 6 may be, it yields, on the one hand, a flow of waste substantially in the form of water from which solid matter has been removed, and it yields, on the other hand, cakes whose ingredients are powdered coal and solid organic matter removed from the sewage supplied to mixer 4 by conduit $c'$. These cakes are transported from filter machine 6 by conventional conveyor means $f'$ to a comminuting machine or grinding machine 7 where they are comminuted or ground to composite granules of coal and mud. These granules are conveyed through duct $g'$ to a point $h'$ of conduit $b'$ where they are enriched with powdered coal and thus converted into a readily combustible furnace fuel. It will be understood that additional mixing means for the substances in ducts $b'$ and $g'$ may be provided, if desired, at point $h'$ of conduit $b'$. The mixture of granulated coal and mud and of powdered coal is ultimately supplied by conduit $b'$ to the furnace of the steam boiler 3 of a thermal power generating station.

The operation of the furnace of steam boiler 3 results in waste heat which may be used to further dry the granulated coal and mud mixture coming from comminuting machine 7. In the drawing reference numeral 8 has been applied to indicate an auxiliary heat exchanger heated by waste heat resulting from the operation of the furnace of boiler 3 and adapted to heat and dry the mixture of coal and organic solids in mud conveyed through conduit $g'$ to conduit $b'$.

The filter surfaces of filter machine 6 may either be covered or lined with powdered coal which may be derived from the operation of coal comminuting machine 2, or they may be covered or lined with ashes resulting from the operation of the furnace of steam boiler 3. Both powdered coal and ashes form excellent filter media which are always available at no extra cost at the composite sewage disposal and power generating system.

Referring now to FIG. 2, in that figure the same reference characters as in FIG. 1 have been applied to indicate like parts and, therefore, FIG. 2 calls for an additional description only to the extent that it differs from FIG. 1.

In the system illustrated in FIG. 2 the second comminuting device to which reference character 7 has been applied in FIG. 1 has been dispensed with. The composite cakes of comminuted coal and organic solids derived from sewer mud are conveyed away from filtering machine 6 by a conveyor $i'$ either to coal storage bunkers 1, or directly to the intake of comminuting machine 2. Conveyor $i'$ extends through auxiliary heat exchanger 8 heated by waste heat resulting from the operation of the furnace of steam boiler 3 to dry the compacted cakes before they are admixed to coal and/or comminuted. In the embodiment of the invention shown in FIG. 2 a portion of the organic solids contained in the sewer mud is fed back to mixer 4 by way of comminuting machine 2 and conduit $d'$. Since this portion is a relatively small portion of the total amount of solid matter contained in the mud which is supplied to the system by conduit $c'$, and since this portion is relatively small in comparison to the amount of organic solid matter derived from sewer mud and burned in the furnace of boiler 3, no harm results from the limited feed-back of sewer mud to mixer 4.

While the preferred form of embodying this invention is in connection with thermal power generating plants having furnaces adapted to burn coal in form of powder, the invention is not limited to the presence of such furnaces. Where it is desired to apply the present invention in combination with a power generating system wherein coal is burned in form of relatively large pieces or lumps, the composite cakes of powdered coal and mud resulting from the operation of filter machine 6 are only reduced to substantially the same size as that of the pieces or lumps of coal normally supplied to the furnace rather than to granular size, and then admixed to coal in form of pieces or lumps.

It will be apparent from the foregoing that according to my invention sewage is disposed by burning thereof without requiring a separate sewage burning system, and without requiring a separate supply of fuel wasted in burning of sewage and that compacting of sewage is effected with coal, which is fully utilized in the process and the provision of which does not involve any additional expense. The local combination of sewage disposal and power generation results in the continuous production of ashes as a by-product of the operation of the furnace, which by-product is an excellent and very desirable medium for initial dehydration of sewer mud.

It will also be understood that the ashes resulting from the operation of the furnace of steam boiler 3 may be added to the mixture formed in mixer 4 instead of being used for lining the filter surfaces of the filtering machine 6. The filter surfaces of the filtering machine 6 may also be lined, if desired, with a mixture of coal in form of powder and of ashes instead of using either of these two compacting media separately.

Since the organic ingredients of sewer mud are burned or subjected to combustion at the high temperatures prevailing in a furnace which is fueled by powdered coal, the thermal efficiency of the process is considerably higher than if combustion were carried out in any other kind of furnace or burner.

The burning of mud resulting from the operation of a sewage disposal system in the steam boiler furnace of a power generating station does completely away with the nuisance of obnoxious odors or smells, this being due to the fact that combustion is carried out at relatively high temperatures and is, therefore, quite complete, and this is also due to the fact that the furnaces of power generating systems are provided with high chimneys or smoke stacks which are in themselves an effective means against spreading of obnoxious odors or smells. It is even possible to dispose of sewage mud in its original or non-fermented state, thus dispensing with the need of providing costly and bulky fermentation towers, or tanks.

It will be understood that the invention is not limited to the embodiments thereof illustrated and described herein in detail. It will also be understood that the processes and the systems described above may be modified without departing from the spirit and the scope of the invention as defined in the accompanying claims.

I claim as my invention:

1. A process of disposing of mud formed in sewage disposal systems and including organic matter in solid form, said process comprising in combination the steps of
   (a) removing a large portion of the content of liquid from mud having a relatively large content of liquid by compacting said mud in the presence of powdered coal and through a mass of powdered coal thereby obtaining a semi-dried composite of powdered coal and mud;
   (b) thereafter adding coal to said composite to obtain a readily combustible furnace fuel, and
   (c) thereafter subjecting said fuel to combustion in a furnace of a thermal power generating station.

2. A process of disposing of mud formed in sewage disposal systems and including organic matter in solid form, said process comprising in combination the steps of
   (a) removing a large portion of the content of liquid from mud having a relatively large content of liquid by compacting said mud in the presence of powdered coal and through a mass of powdered coal thereby obtaining a semi-dried composite of coal and mud in cake form;
   (b) comminuting said composite to granular size;
   (c) increasing the content of powdered coal of said composite to obtain a readily combustible furnace fuel, and
   (d) thereafter subjecting said fuel to combustion in a furnace of a thermal power generating station.

3. A process for disposing of mud formed in sewage disposal systems and including organic matter in solid form, said process comprising in combination the steps of
   (a) admixing coal in powder form to mud having a relatively high content of liquid thereby obtaining a mixture of coal and mud;
   (b) compacting said mixture to reduce the content of liquid thereof;
   (c) comminuting said mixture with reduced content of liquid to impart substantially granular form to said mixture;
   (d) increasing the content of coal of said mixture to obtain a readily combustible furnace fuel by the adding of powdered coal thereto; and
   (e) subjecting said fuel to combustion in a boiler heating furnace.

4. A process as specified in claim 3 wherein said mixture of coal and mud having a relatively high content of liquid is being compacted through a layer in powder form.

5. A process as specified in claim 3 wherein said mixture of coal and mud having a relatively high content of liquid is compacted through a layer of ash resulting from combustion of said furnace fuel.

6. A process as specified in claim 3 comprising the steps of drying said mixture by hot gases resulting from combustion of said furnace fuel before increasing the coal content of said mixture.

7. A process of disposing of mud formed in sewage disposal systems and including organic matter in solid form, said process comprising in combination the steps of
   (a) comminuting coal including pieces of relatively large size substantially to powder form;
   (b) admixing said coal in powder form in such proportion to mud having a relatively high content of liquid to obtain a mixture of coal and mud sufficiently fluid to be moved through pipes by pumping means;
   (c) pumping said mixture from a point where said coal is admixed to said mud to another point and compacting said mixture at said other point to reduce the content of liquid thereof;
   (d) comminuting said mixture with reduced content of liquid to impart substantially granular form to said mixture;
   (e) admixing to said mixture when in granular form an additional quantity of coal in powder form to convert said mixture into a readily combustible furnace fuel; and
   (f) subjecting said fuel to combustion in a boiler heating furnace.

8. A process of disposing of mud formed in sewage disposal systems and including organic matter in solid form, said process comprising the steps of
   (a) comminuting coal including pieces of relatively large size substantially to powder form;
   (b) admixing said coal in powder form in such proportions to mud having a relatively high content of liquid to obtain a mixture of coal and mud sufficiently fluid to be moved through pipes by pumping means;
   (c) pumping said mixture from a point where said coal is admixed to said mud to another point and compacting said mixture at said other point to reduce the content of liquid thereof;
   (d) adding said mixture with reduced content of liquid to coal including pieces of relatively large size;
   (e) jointly comminuting said mixture and said coal including pieces of relatively large size to obtain a substantially pulverulent furnace fuel; and
   (f) subjecting said fuel to combustion in a boiler heating furnace.

9. A combined sewage disposal and thermal power generating station comprising in combination
   (a) a boiler furnace;
   (b) a first conduit for supplying said furnace with powdered coal;
   (c) a first comminuting machine for powderizing coal to be supplied to said first conduit;
   (d) a mixer adapted to mix powdered coal and sewage having a relatively large content of liquid;
   (e) a second conduit connecting a point of said first conduit downstream of said first comminuting machine to said mixer;
   (f) a filter system for reducing the content of liquid of the mixture of coal and mud formed in said mixer and for converting said mixture into cake form;
   (g) a second comminuting machine for granulating said mixture in cake form; and
   (h) a third conduit connecting said second comminuting machine with a point of said first conduit situated downstream of said first comminuting machine.

10. A combined sewage disposal and thermal power generating station comprising in combination
    (a) a boiler furnace;
    (b) a first conduit for supplying said furnace with powdered coal;
    (c) a comminuting machine for comminuting coal to be supplied to said first conduit;

(d) a mixer adapted to mix comminuted coal and sewage having a relatively large content of liquid;
(e) a second conduit connecting a point of said first conduit downstream of said coal comminuting machine to said mixer;
(f) a filter system for reducing the content of liquid of the mixture of coal and mud formed in said mixer and for converting said mixture into cake form; and
(g) conveyor means for transporting said mixture in cake form from said filter system to the intake end of said comminuting machine.

References Cited by the Examiner

UNITED STATES PATENTS

| | | | |
|---|---|---|---|
| 994,002 | 5/11 | Hyde | 110—8 |
| 1,195,784 | 8/16 | Culver | 110—8 |
| 1,892,681 | 1/33 | Rankin | 110—8 |
| 2,213,668 | 9/40 | Dundas et al. | 110—15 |

JAMES W. WESTHAVER, *Primary Examiner.*
JOHN J. CAMBY, *Examiner.*